March 11, 1941. A. E. ENGLAND 2,234,370
DOUBLE SHEARING LAWN EDGER
Filed April 25, 1939 2 Sheets—Sheet 2
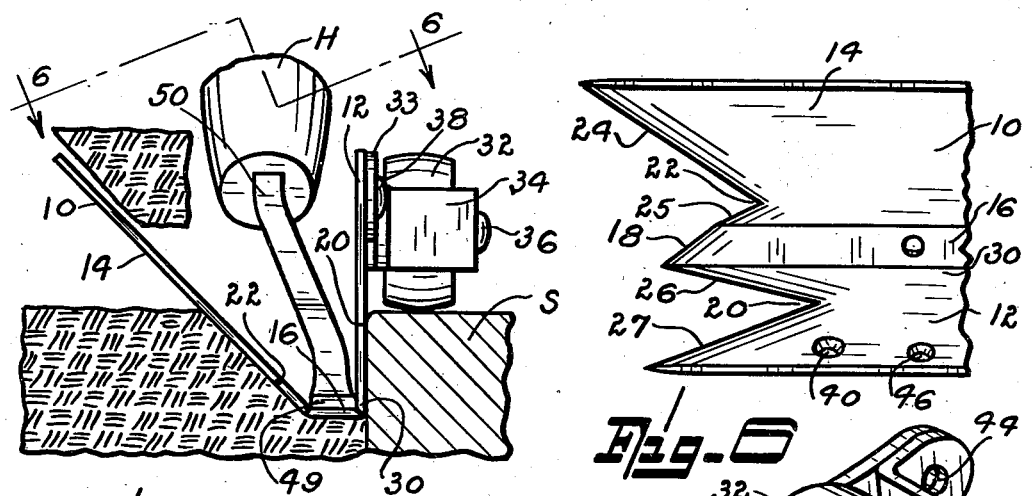
INVENTOR
Alex E. England
BY
Smith & Tuck
ATTORNEYS Patented Mar. 11, 1941

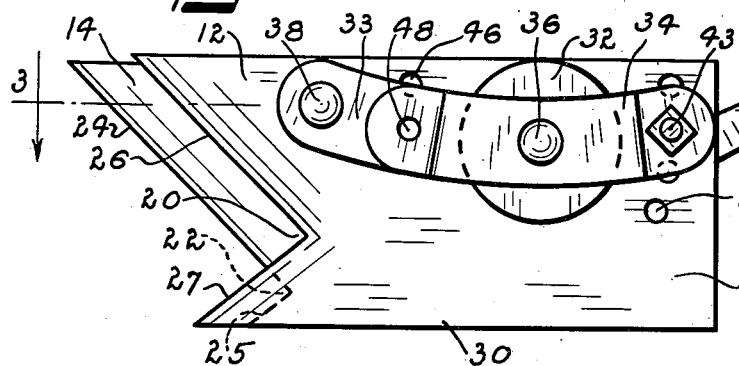

2,234,370

UNITED STATES PATENT OFFICE 2,234,370

DOUBLE SHEARING LAWN EDGER

Alex E. England, Seattle, Wash.

Application April 25, 1939, Serial No. 269,983

1 Claim. (Cl. 97—227)

My present invention relates to the general art of lawn edging tools and more particularly to a double shearing lawn edger.

My invention consists essentially of a sheet steel cutter which is formed normally with one vertically disposed wall, a short horizontal surface at the lower extremity of that wall, and then an angularly disposed outer cutting wall. The two wall surfaces that provide the principal cutting means of my edger are each provided with a notched cutting face which is so arranged that a double shearing action takes place which has proved to be very efficient when used particularly where heavy matted sods are encountered.

A great many types of lawn edgers have been produced to date. They are generally divided into two types. First the pusher type where a cutting action is accomplished by forcing a cutting blade through the mass, and secondly a rolling blade type employing either a smooth disc cutter or a serrated disc cutter. It has been found, however, that the majority of these tools require excessive force to operate and are difficult to guide accurately, particularly where heavy cutting resistance is met. With my present device I provide means, in the manner of attaching my handle and the formation of my cutting blade, so that the edger itself tends to hog into the sidewalk slightly as it is pushed forward, its cutting depth is guided by preferably a free turning roller and the shape of the cutting member as a whole gives it a tendency to dig into the ground comparable to the action of the ordinary moldboard plow. These elements combine to give a very efficient device when used with my double shearing cutting blade, which very substantially reduces the effort required to pass the edger through sod, and also assures a smooth, clean and thoroughly cut margin.

The principal object of my present invention is therefore to provide a lawn edger which can be properly and easily used by a person unskilled in the use of such tools.

A further object of my invention is to provide a unique cutting edge so arranged as to provide a cleanly cut margin with the minimum of effort.

A further object is to provide means whereby my edger will tend to follow the desired line with the minimum of directing effort.

Still another object is to provide means whereby the depth of the kerf made by my cutter can be adjusted and once adjusted the depth of the kerf will be uniform throughout the entire operation.

Other and more specific objects will be apparent from the following description taken in connection with the accompanying drawings, wherein Figure 1 is a side elevation of an edging tool made after the teachings of my invention, the handle, which is relatively long, is broken away to better illustrate the construction of the cutter member itself.

Figure 2 is a vertical sectional view through my device as illustrated in Figure 1.

Figure 3 is a cross-sectional view taken along the line 3—3 of Figure 1.

Figure 4 is a typical cross-sectional view through my lawn edger.

Figure 5 is a view taken in the same sense as Figure 4, but showing the manner in which material is removed from the kerf created by my cutter.

Figure 6 is a top plan view of a portion of my cutter taken substantially along the plane indicated by the dashed line 6—6 of Figure 5. This view is intended to show the toothed cutting edges in their proper relationship.

Figure 7 is a perspective view showing one form of guide and depth gaging roller assembly used with my device.

Figure 8 is a perspective view showing the handle attaching means employed to secure the handle to the cutting blade.

Figure 9 is a perspective view of the cutting blade itself with the various other parts removed so as to better illustrate one desirable form of its construction.

Referring to the drawings, throughout which like reference characters indicate like parts, 10 designates my cutter member generally. This consists for normal edging work in one cutting blade 12 which is normally vertically disposed and an inclined cutting blade 14. These two blades are normally formed from one piece of stock and the joining member between the two blades is formed substantially at right angles to plate 12. This bottom cutting member 16 is provided normally with a one-way cutting point probably best illustrated at 18 in Figure 6. Each of the side cutting blades 12 and 14 are provided with a deep set notch as at 20 and 22 respectively. The entire forward edge of plates 12, 14, and 16 is sharpened so as to provide the cutting edges 18, 24, 25, 26, and 27.

A preferred arrangement of these blades is probably best illustrated in Figure 1 wherein it will be noted that the long cutting edge of blade 14 at 24 is disposed forwardly of the long cutting edge 26 of plate 12. The short cutting edges, however, as 25 and 27, are oppositely disposed with the short cutting edge 27 of plate 12 leading the shorter cutting edge 25 of plate 14. This arrangement has been found to give the greatest shearing action, the cleanest cutting, and to accomplish this with the least actual effort required on the part of the operator. The physical effect of this arrangement might be likened to striking a curb or bump in a road with an automobile which can negotiate that curb or cross-bump most easily if one wheel at a time engages the same. In a like manner, when serious resistance is encountered, this staggering of the cutting blades, after the arrangement shown, so disposes the blades that they operate successively and not all at one time, and in this way the maximum effort required to pass the cutter through sodded areas is substantially reduced.

There is another distinct advantage, however, as the result of the notching of the leading cutting edges aside from the ease of operation. It has been found from long experience that when sod is encountered there is a tendency for it to slide up a cutting edge rather than actually to be cut by that edge. However, with the present arrangement the sliding action can only go up for a limited extent and then the sod encounters the slanting blades 24 and 26, which are so disposed that any tendency for the sod to slide along them will tend to force the sod down into the ground where there is adequate backing so that clean cutting is then assured. This action is particularly notable when a single cutting plate is used. If for instance a single plate as 12 is used, it can in the hands of a skilled operator provide a very convenient edging tool. This utility is further improved if the lower edge as 30 is sharpened to the same degree that the leading cutting edges are. Then a very useful tool is provided for working in badly rooted areas because the operator has the advantage of the lower cutting edge as well as the forward cutting edge, and where roots of any magnitude are encountered I find it very desirable to use this single cutter.

In using my edger, if a clean-cut, workmanlike job is to be done, it is desirable that the depth of the kerf be definitely limited with respect to the sidewalk adjoining the cut or kerf, and to this end I have provided an adjustable roller 32. This roller may be revolvably secured to the cutter plate in any convenient manner. In the form shown, I have indicated the roller as being supported between two plates 33 and 34. This is not an essential structure as it will be readily understood that the axle or pin 36 upon which roller 32 revolves might be fixedly secured to member 33 as by welding or riveting thereto. The form shown, however, lends itself to economical manufacture and is convenient for use. The roller carrying frame is pivoted on a rivet, preferably, at 38 which passes through opening 39 and also through opening 40 in plate 12 and provides thereon a pivot about which the entire roller assembly may be adjustably positioned. One convenient means of positioning the roller carrier is by means of a plurality of holes 42; then by passing a bolt 43 through hole 44 of the roller carrier and the desired opening 42, a definite fixed adjustment will be obtained which can be varied for various types of work. In some instances, where the maximum depth of cut is necessary, it may be desirable to move the roller assembly up out of normal operating position. When the roller assembly is moved upwardly hole 46 in member 12 becomes aligned with hole 48 of the roller assembly. A bolt similar to bolt 43 is used to lock the members in rigid relationship. It is desired to point out that when the device is used in firm ground or in heavily matted turf, there is considerable resistance encountered in the passage of the edger through the ground. Consequently, the edger is then tipped with its leading point 18 disposed slightly downwardly so that it will dig into the ground after the manner of a plow. Under such conditions it is very desirable that a roller as 32 be used instead of a fixed bearing member so that considerable weight can be placed upon the cutter without creating undue friction.

As a means for operating my cutter, I provide a handle H; this handle is preferably made of wood of a length comparable to a hoe or rake handle so that the angle that the handle makes with the ground will not be too great. I further find it desirable to position the handle at a slight angle with plate 12, as viewed from the top as illustrated in Figure 3, so that as the thrust of the operator is placed upon the handle the whole edger will be pressed, by a component of that force, against the sidewalks and thus assure a kerf of exact width as well as depth. The manner of attaching the handle to the edger is probably best served by the device illustrated in perspective in Figure 8 and throughout the various views. This consists normally of a forging or casting that has a foot portion 49 which is secured, as by riveting thereto, to the horizontally disposed surface 16; the leading and trailing edges of this foot should preferably be rounded off as illustrated so as to afford the minimum of resistance as it passes through the ground.

Handle H is secured to the upstanding spike member 50 which, it will be observed, is inclined to the rear and slightly away from the plane of plate 12. When so arranged the thrust of the operator will be properly divided into, a component to drive the device along the sidewalk in the direction of the kerf, a small component forcing the edger against the sidewalk and a further component which forces the edger down into the ground. The proportions shown in Figure 2 have proved quite satisfactory, but for different conditions some experiments might be necessary to determine the most desirable angle.

The foregoing description and the accompanying drawings are believed to clearly disclose a preferred embodiment of my invention, but it will be understood that this disclosure is merely illustrative and that such changes in the invention may be made as are fairly within the scope and spirit of the following claim.

Having thus fully described my invention, what I claim as new and desire to secure by Letters Patent is:

A lawn edger comprising a perpendicular guide wall having a front notch forming rearwardly converging shearing edges, a base disposed at right angles to said guide wall, said base having a front rearwardly extending diagonal shearing edge in advance of the converging point of the shearing edges of the perpendicular wall, a handle having an elongated flange attached on top of said base, a guiding and discharging wall outwardly tilted from said base, said tilted wall also having a front notch forming rearwardly converging shearing edges with their converging point at the rear of the diagonal shearing edge, the front longer shearing edge of the notched tilted wall being in advance of the front longer shearing edge of the notched perpendicular wall, and the shorter shearing edge of the tilted wall being located at the rear of the complementary shearing edge of the perpendicular wall.

ALEX E. ENGLAND.